(12) United States Patent
Won

(10) Patent No.: US 6,755,582 B2
(45) Date of Patent: Jun. 29, 2004

(54) KEY STRUCTURE

(76) Inventor: Hwa-Twu Won, 3F, No. 91, Yung Li Rd., Yung Ho City, Taipei Hsien (TW)

( * ) Notice: Subject to any disclaimer, the term of this patent is extended or adjusted under 35 U.S.C. 154(b) by 0 days.

(21) Appl. No.: 10/131,247

(22) Filed: Apr. 25, 2002

(65) Prior Publication Data

US 2003/0202833 A1 Oct. 30, 2003

(51) Int. Cl.$^7$ .................................................. B41J 5/08
(52) U.S. Cl. .................... 400/490; 400/479; 400/491.2; 400/495; 200/344; 200/345
(58) Field of Search ................................ 400/473, 480, 400/491.3, 490, 491.2, 495, 479; 200/344, 345

(56) References Cited

U.S. PATENT DOCUMENTS

| | | | | |
|---|---|---|---|---|
| 4,480,937 A | * | 11/1984 | Eckhardt | 400/479 |
| 4,492,838 A | * | 1/1985 | Fukukura | 200/517 |
| 6,084,190 A | * | 7/2000 | Kenmochi | 200/341 |
| 6,303,888 B1 | * | 10/2001 | Okamoto et al. | 200/517 |
| 6,501,036 B2 | * | 12/2002 | Rochon et al. | 200/302.2 |

* cited by examiner

Primary Examiner—Andrew H. Hirshfeld
Assistant Examiner—Kevin D. Williams
(74) Attorney, Agent, or Firm—Dennison, Schultz, Dougherty & MacDonald

(57) ABSTRACT

A key structure includes a set of key tops with contact footings of retaining hooks, an upper case with a plurality of insert holes wherein contact footings of retaining hooks are moveably inserted therein and a bottom case to be assembled with the upper case; the present invention is characterized that elastic upper and lower electrode members made of metal and capable of conducting electricity are inserted between every key top and the bottom case; the depressed key top synchronously presses the upper and the lower electrode members to deform and displace to make the upper and the lower electrode members contact each other, conduct electricity and transmit signals; when the force exerted onto the key top is released, the upper and the lower electrode members recoil to disconnect each other and discontinue electric conduction; the simplified parts of the present invention and the elimination of the conventional upper and lower electric conducting membrane sheets efficiently reduce the pollution when the keyboard is discarded for recycling.

4 Claims, 10 Drawing Sheets

KEY STRUCTURE

BACKGROUND OF THE INVENTION

1) Field of the Invention

The present invention provides a key structure, more especially, a key applied on a computer keyboard or a remote control.

2) Description of the Prior Art

Accordingly, the structure of a computer keyboard, as shown in FIG. 6 mainly includes a set of keys (A) moveably inserted into a connecting hole (B1) of an upper case (B); an elastic layer of silicone rubber (C) has a plurality of elastic convex bodies (C1) corresponding to the bottom portions of keys (A); an upper electric conducting membrane sheet (D) with an upper electrode connecting point (D1) printed and a circuit (D2) distributed on the surface thereof; a lower electric conducting membrane sheet (E) with a lower electrode connecting point (E1) printed and a circuit (E2) distributed on the surface thereof, an intermediate interfacing and isolating membrane sheet (F, an isolating piece) with a plurality of through holes (F1) disposed on the lower surface thereof; a bottom case (G) to be assembled with the upper case (B); wherein, when the key (A) is depressed, the elastic convex body (C1) contracts and deforms to further press the upper membrane sheet (D) to deform thereby to make the upper and the lower electrode connect points (D1, E1) contact each other via the through hole (F1) for electric conduction and signal transmission; when the force exerted on the key (A) is released, the elastic convex body (C1) and the upper membrane sheet (D) resume to the original position and the upper and the lower electrode connect points (D, E) resume and do not contact each other The said keyboard has the following shortcomings after a long-term usage:

(1) Environmentally unfriendly—The surfaces of the upper and the lower electric conducting membrane sheets (D, E) are printed with electric conducting electrode connecting points (D1, E1) made of rubber sheet in silver material and circuits (D2, E2); when the keyboard is discarded, the silver rubber material of the electric conducting membrane sheets (D, E) causes pollution which is hard to be handled; furthermore, the upper and the lower electric conducting membrane sheets (D, E) and the elastic rubber sheet (C) are hard to be decomposed after the keyboard is discarded for recycling.

(2) Increased cost—In order to enable the key (A) to elastically displace up and down, four members (the elastic rubber sheet, the upper electric conducting membrane sheet, the lower electric conducting membrane sheet as well as the intermediate interfacing and isolating membrane sheet) are required and that tremendously increases the manufacturing In view of the abovementioned shortcomings, the inventor of the present invention searched to not only maintain the key's specialty of making elastic displacement up and down when it is depressed, but also eliminate the said four members.

SUMMARY OF THE INVENTION

Therefore, the primary objective of the present invention is to provide an improved key structure, simplify the parts and eliminate the upper and the lower electric conducting membrane sheets so as to efficiently reduce the pollution when the keyboard is discarded for recycling.

Another objective of the present invention is to provide an improved key structure for making precise descending and resuming movements of the key even after a long-term usage.

Yet another objective of the present invention is to provide an improved key structure for simplifying the components of the key structure thereby to reduce the manufacturing cost.

To enable a further understanding of the structural features, the objectives and the effects of the present invention, the brief description of the drawings below is followed by the detailed description of the preferred embodiment.

DETAILED DESCRIPTION OF THE PREFERRED EMBODIMENTS

Figure 1A:
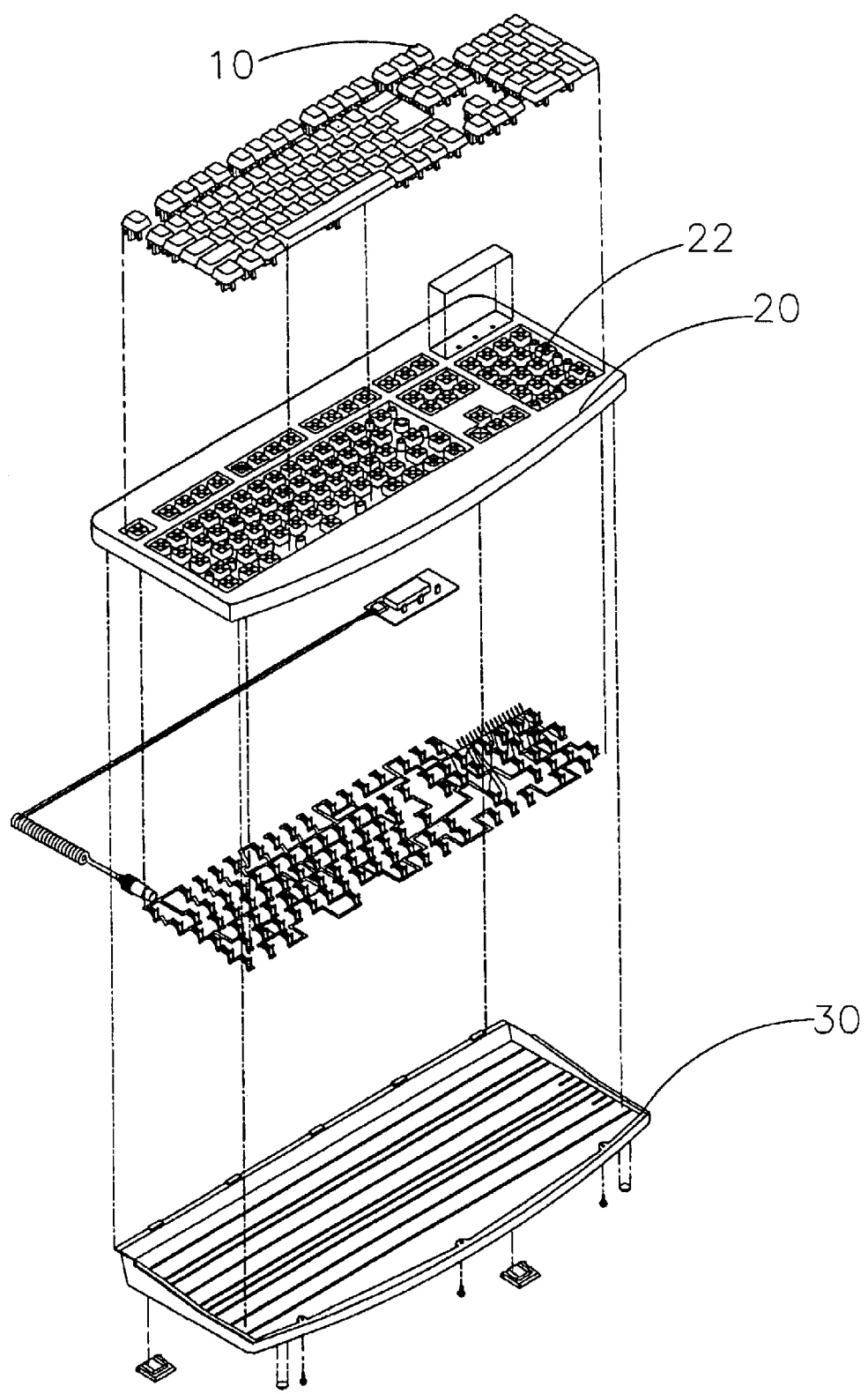
FIG. 1A is a perspective and exploded drawing of the parts of the present invention.
Figure 1B:
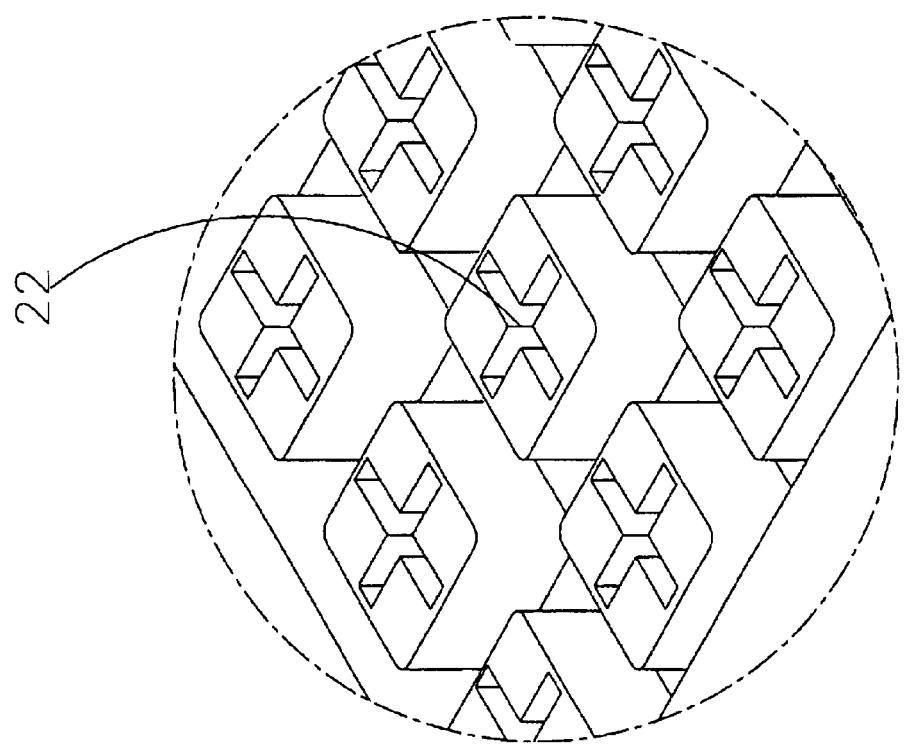
FIG. 1B is a partially enlarged drawing of an upper case of the present invention.
Figure 1C:
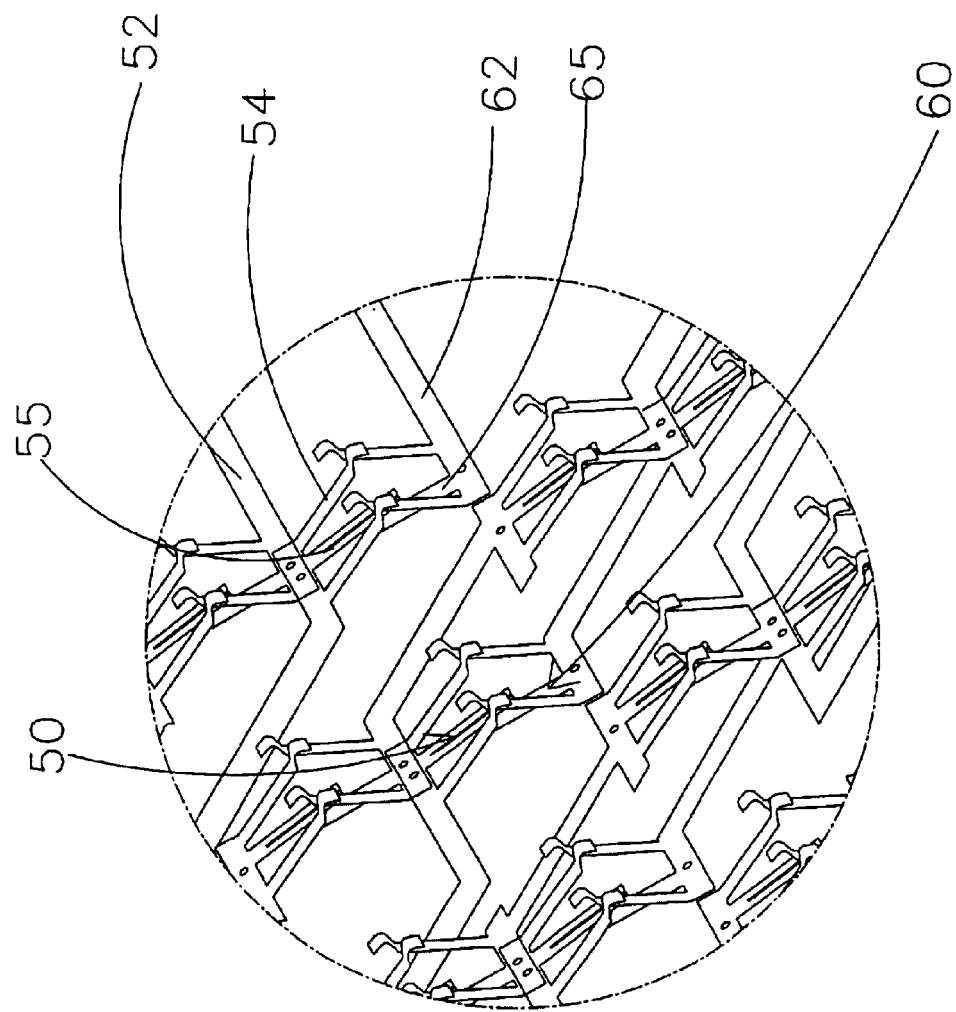
FIG. 1C is a perspective and enlarged drawing of an upper and a lower electrode members of the present invention.

Referring to FIGS. 1A, 1B, 1C, 2A, 2B and 4, the present invention comprises a set of key tops (10) with contact footings (12) of retaining hooks, an upper case (20) with a plurality of insert holes (22) wherein contact footings (12) of retaining hooks are moveably inserted in insert holes (22) and a bottom case (30) to be assembled with the upper case (20); the present invention is characterized that elastic upper and lower electrode members (50, 60) made of metal and capable of conducting electricity are inserted between every key top (10) and the bottom case (30); the depressed key top (10) synchronously presses the upper and the lower electrode members (50, 60) to deform and displace so as to make the upper and the lower electrode members (50, 60) contact each other, conduct electricity and transmit signals; when the force exerted onto the key top (10) is released, the upper and the lower electrode members (50, 60) recoil to disconnect each other and discontinue electric conduction.

Figure 3A:
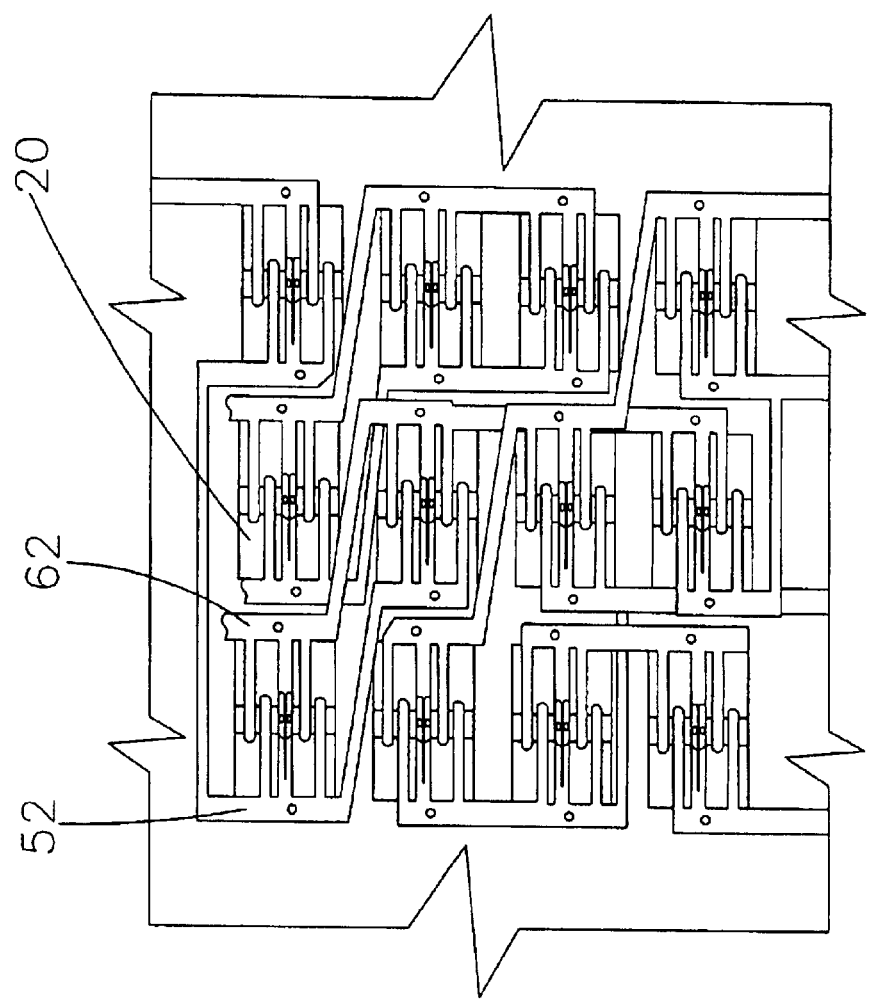
FIG. 3A is a partial plane drawing of the upper and the lower electrode members connecting with the upper case of the present invention.
Figure 3B:
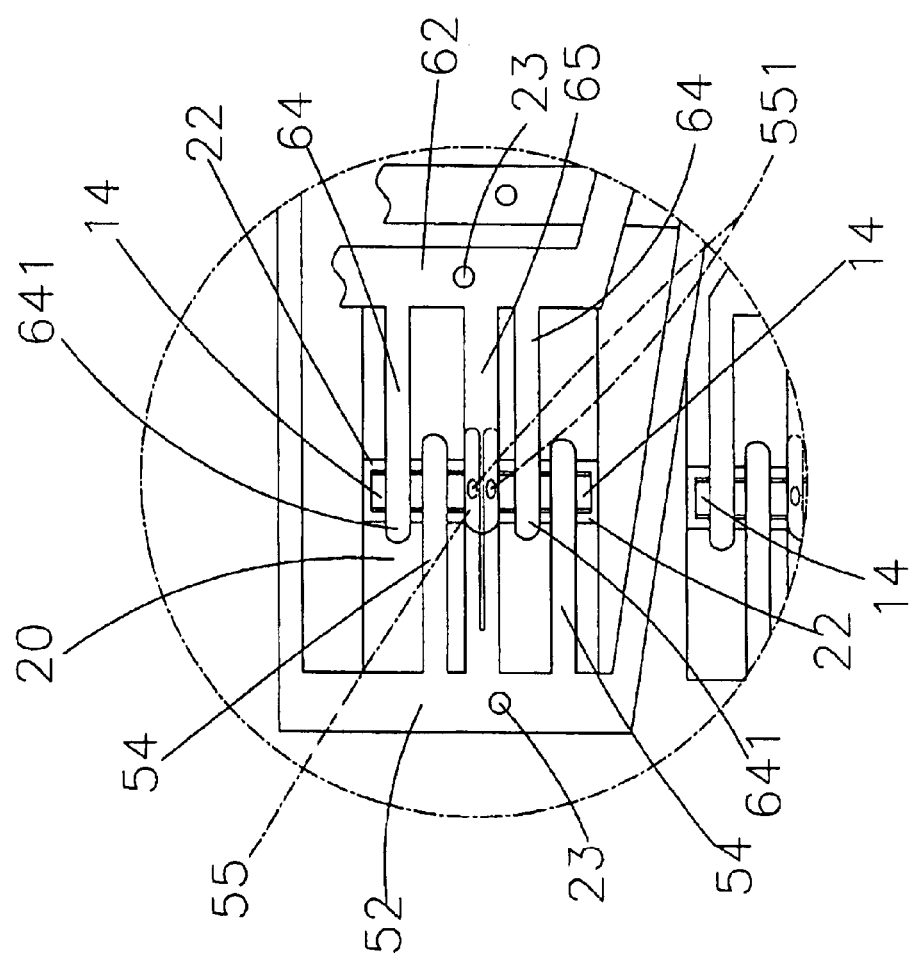
FIG. 3B is a partially enlarged drawing of the upper and the lower electrode members shown in FIG. 3A.

According to the said primary features of the present invention, wherein the upper electrode member (50) convexes upwardly via the inner lateral side rim of a connecting band (52) to dispose at least one elastic arm (54) slanted at an upward angle and an upper electric conducting piece (55)

disposed at a smaller angle of elevation; wherein the lower electrode member (60) convexes upwardly via the inner lateral side rim of a connecting band (62) to dispose at least one elastic arm (64) at an angle of elevation and a lower electric conducting piece (65) in horizontal or almost horizontal position; wherein the elastic arms (54, 64) of the upper and the lower electrode members (50, 60) are staggered in parallel without contacting each other; when being depressed, the upper electric conducting piece (55) displaces downwardly to contact the lower electric conducting piece (65), as shown in FIG. 3, for conducting electricity and transmitting signals through the circuits of two connecting bands (62, 52).

According to the said primary and secondary features of the present invention, wherein the connecting bands (52, 62) are disposed with through holes (521, 621); the bottom plane of the upper case (20) is disposed with a convex pin (23) to be inserted and positioned in the through holes (521, 621) for connecting the connecting bands (52, 62) to position on the surface of the bottom portion of the upper case (20).

According to the said primary and secondary features of the present invention, wherein the upper electric conducting piece (55) in the upper electrode member (50) has at least one moveable connecting point (551) protruding downwardly; the top ends of the elastic arms (54, 64) of the upper and the lower electrode members (50, 60) are arched portions (541, 641).

According to the said primary and secondary features of the present invention, wherein the lower end of the key top (10) has a transverse bar (14) attached to proper positions of the arched portions (641, 541) on the top end of the elastic arms (54, 64) for pressing the arched portions (641, 541) downwardly to make the elastic arms (54, 64) and the upper electric conducting piece (55) to elastically displace and deform downwardly, furthermore, to make the connecting point (551) on the upper electric conducting piece (55) contact the lower electric conducting piece (65) for electric conduction.

According to the said primary and secondary features of the present invention, wherein the upper electric conducting piece (55) is cut into two halves thereby to have two connecting points (551) for enhancing the contacting stability when the upper electric conducting piece (55) presses downwardly to contact the lower electric conducting piece (65).

Figure 5:
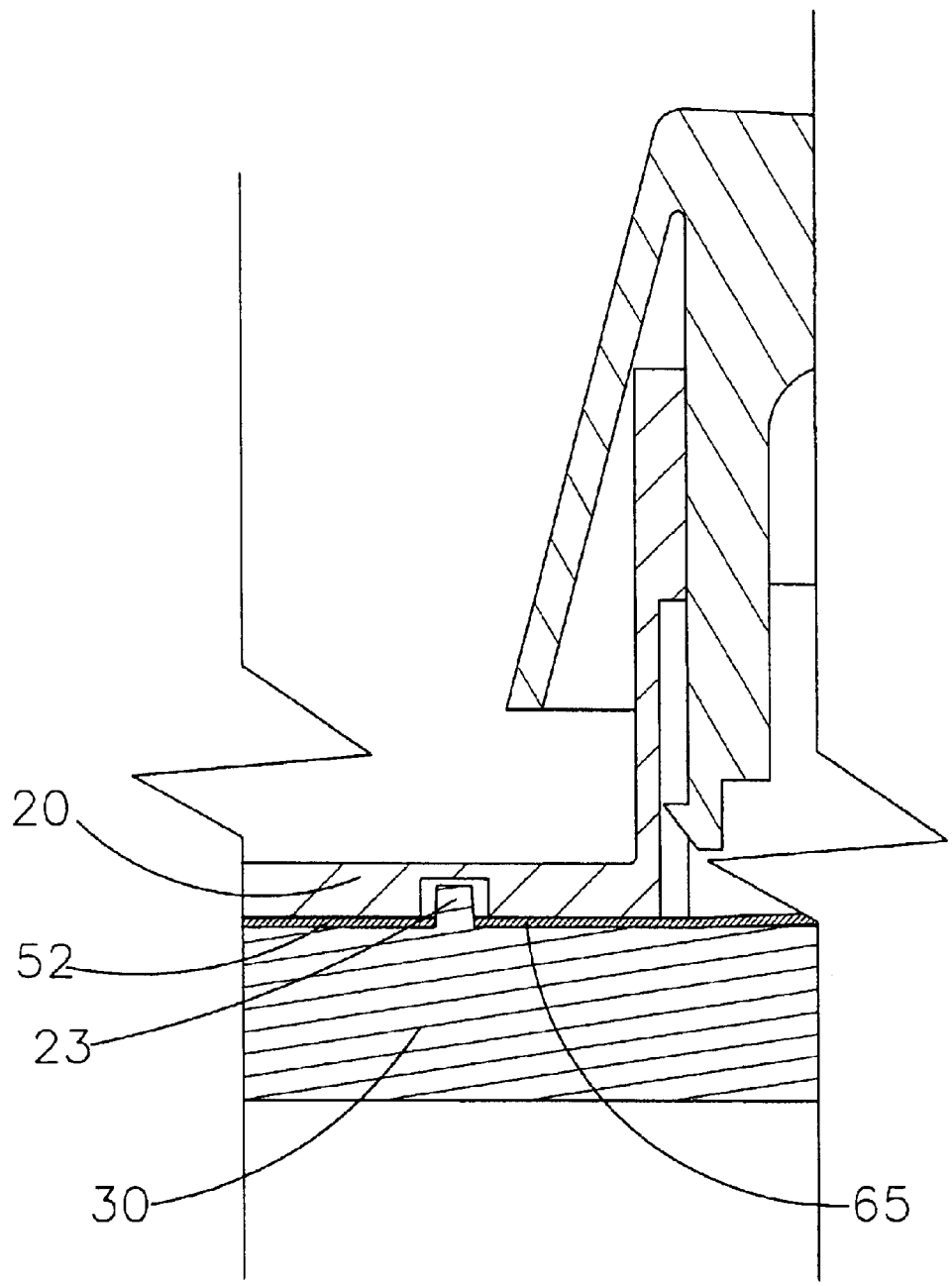
FIG. 5 is a cross sectional drawing of a convex pin designed to dispose on the surface of the bottom case and connect with the upper and the lower electrode members of the present invention.
Figure 6:
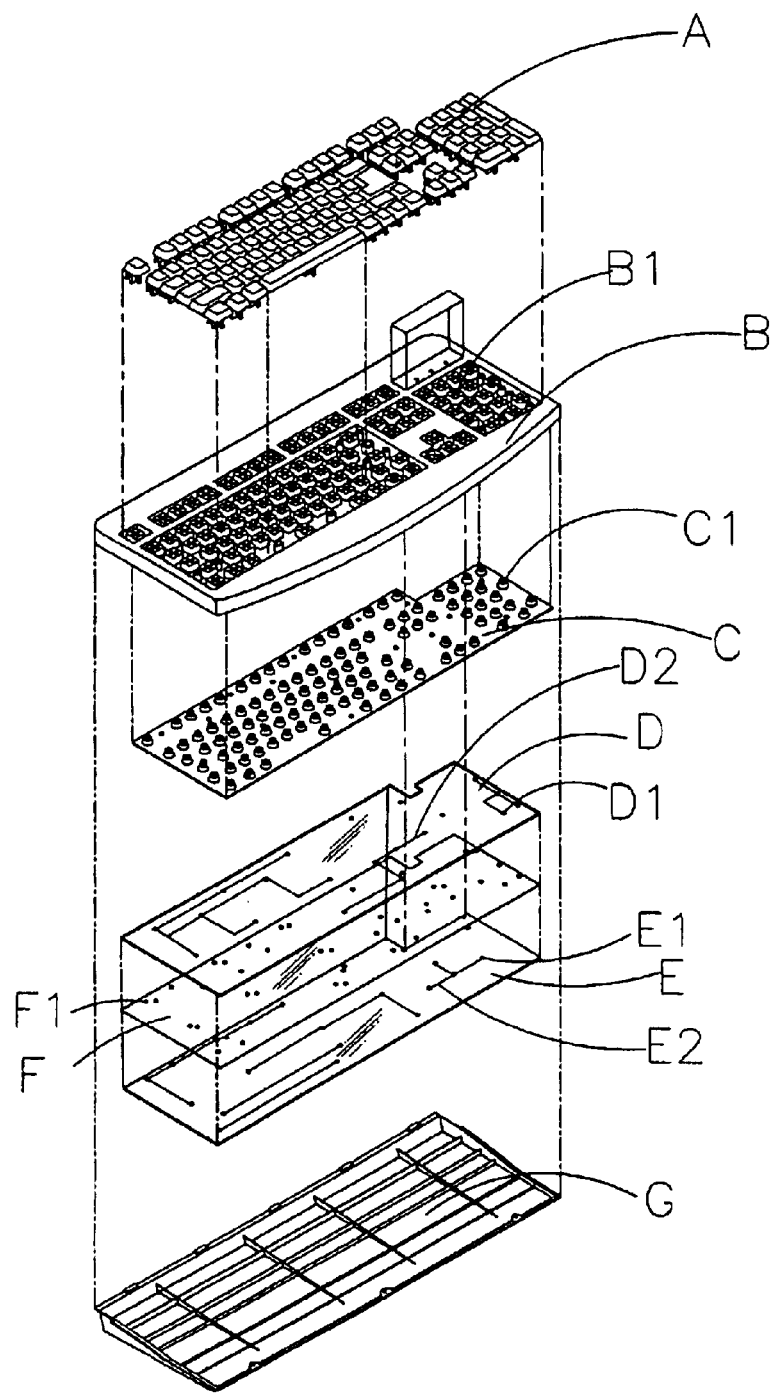
FIG. 6 is a perspective and exploded drawing of the parts of a conventional computer keyboard.

According to the said primary and secondary features of the present invention, wherein the convex pin (23) inserted and positioned by the through holes (521, 621) of the connecting bands (52, 62) of the upper and the lower electrode members (50, 60) is optionally designed to be disposed on the interior surface of the bottom case (30), as shown in FIG. 5.

According to the said primary and secondary features of the present invention, the following outstanding effects and exemplary embodiments can be achieved:

1. Referring to FIGS. 1 and 2, the special features of the design of the present invention is that the upper and the lower electrode members (50, 60) connected and inserted on the bottom end surface of the upper case (20); the contact footing (12) of the retaining hook of the key top (10) is moveably inserted in the insert hole (22) of the upper case (20); the upper and the lower electrode members (50, 60) are unitarily molded by elastic and electric conducting metal reed through punch press technique; when the key top (10) is depressed by a finger to descend, the transverse bar (14) thereof presses the arched portions (541, 641) to displace downwardly; since the upper electric conducting piece (55) is at a slightly slanted angle, when the arched portions (541, 641) are under pressure, the elastic arms (54, 64) displace downwardly; the bottom plane of the lower electric conducting piece (65) contacts the bottom surface of the bottom case (30); therefore, the lower electric conducting piece (65) stays still; referring to FIG. 2, when the elastic arms (54, 64) and the upper electric conducting piece (55) are pressed by the transverse bar (14) to make the upper electric conducting piece (55) displace downwardly to the lower dead point, at least one connecting point (551) on the upper electric conducting piece (55) contacts the surface of the lower electric conducting piece (65), therefore, the circuits of the upper and the lower electrode members (50, 60) communicate for transmitting signals; wherein, a plurality of through holes (521) are respectively disposed on two connecting bands (52, 62); the said connecting bands (52, 62) forms network circuit lines for conducting electricity so as to connect with the computer controlling system by arranging either in a straight line or at certain angles; via the through holes (521, 621), the connecting bands (52, 62) can be respectively inserted in to the convex pin (23) of the upper case (20) for efficient positioning; the connecting bands (52, 62) as well as the upper and the lower electrode members (50, 60) are thereby efficiently positioned at the lower aspect of the upper case (20); as shown in FIG. 5, the convex pin (23) of the present invention can be optionally designed, according to the need, to dispose on the upper surface of the bottom case (30) to allow the through holes (521, 621) of the connecting bands (52, 62) to be also inserted and positioned on the bottom case (30).

Figure 2A:
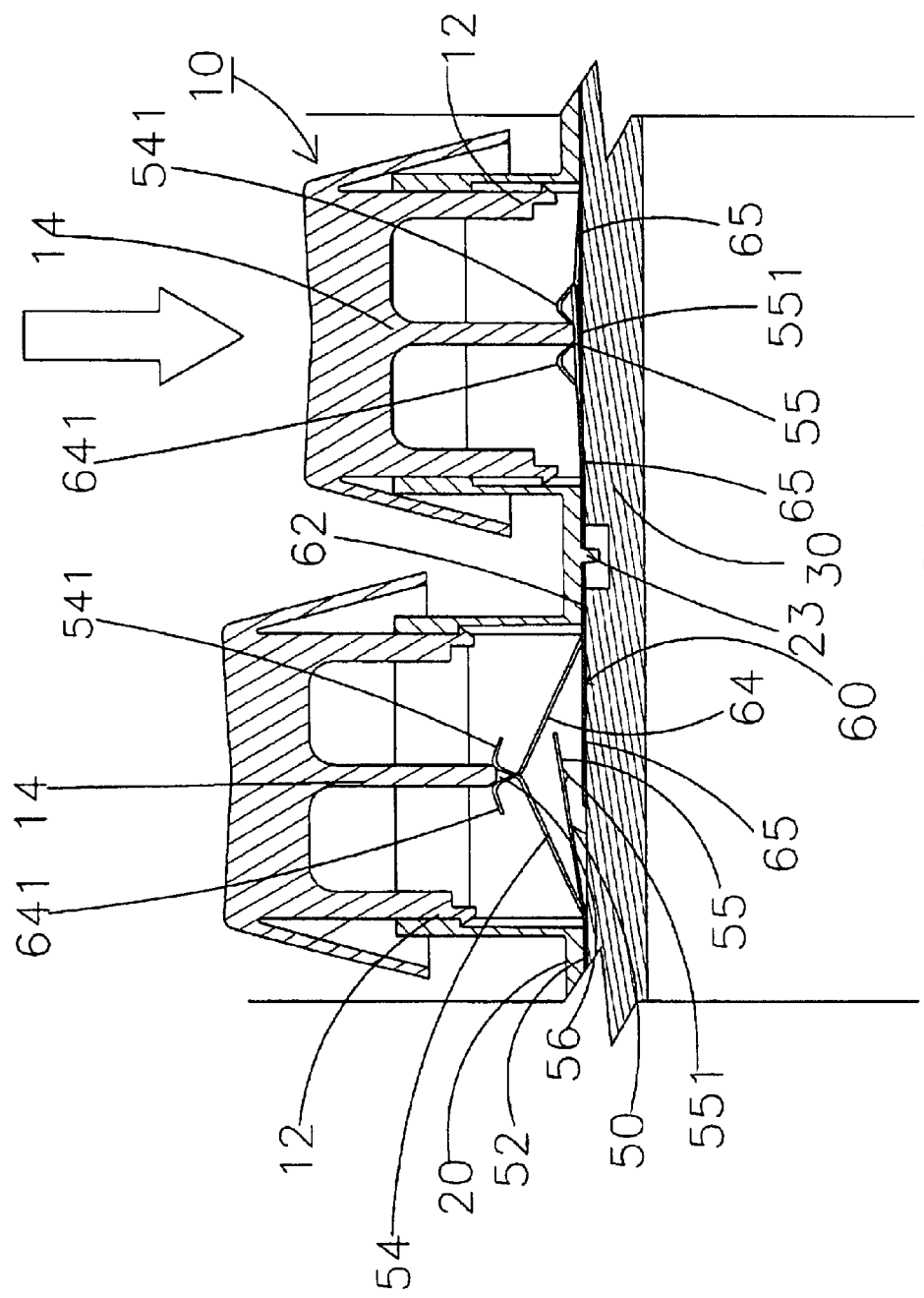
FIG. 2A is a partially cross sectional drawing of the present invention.
Figure 2B:
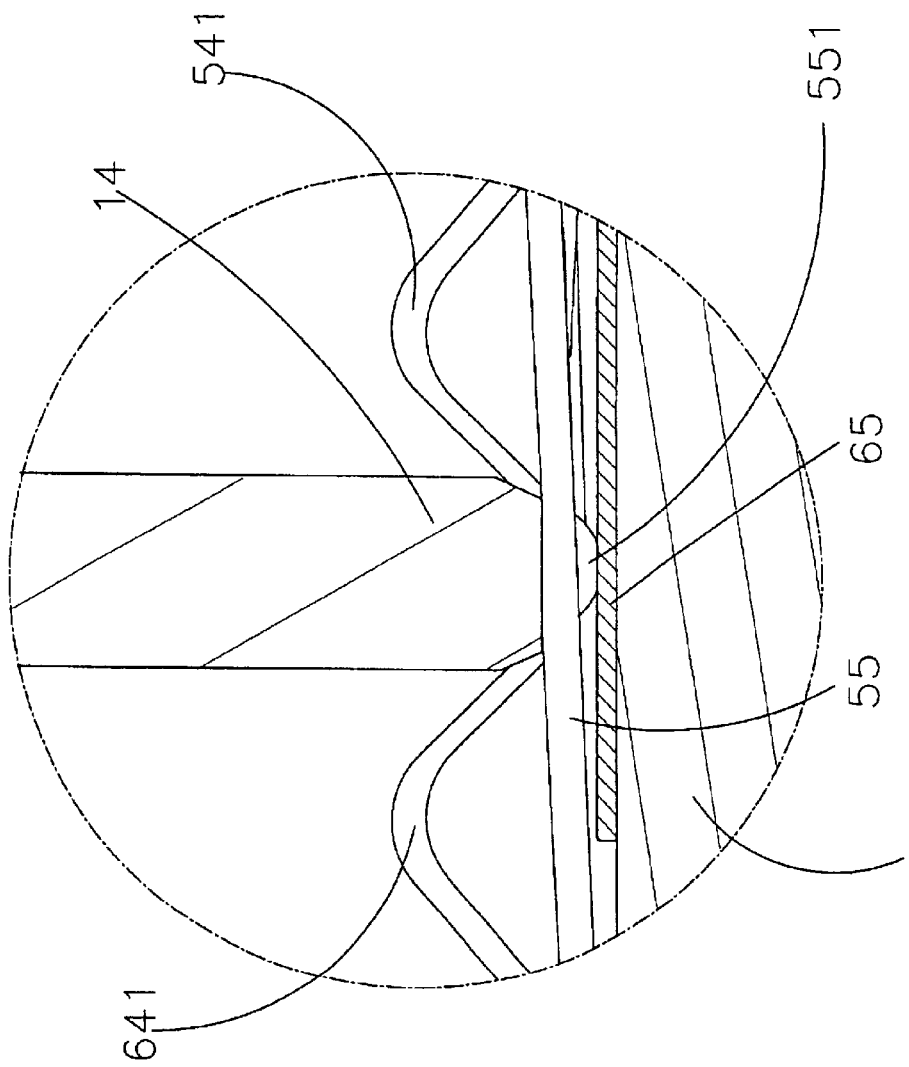
FIG. 2B is an enlarged drawing of the cross section of the contact between the upper and the lower electric conducting pieces shown in FIG. 2A.
Figure 4:
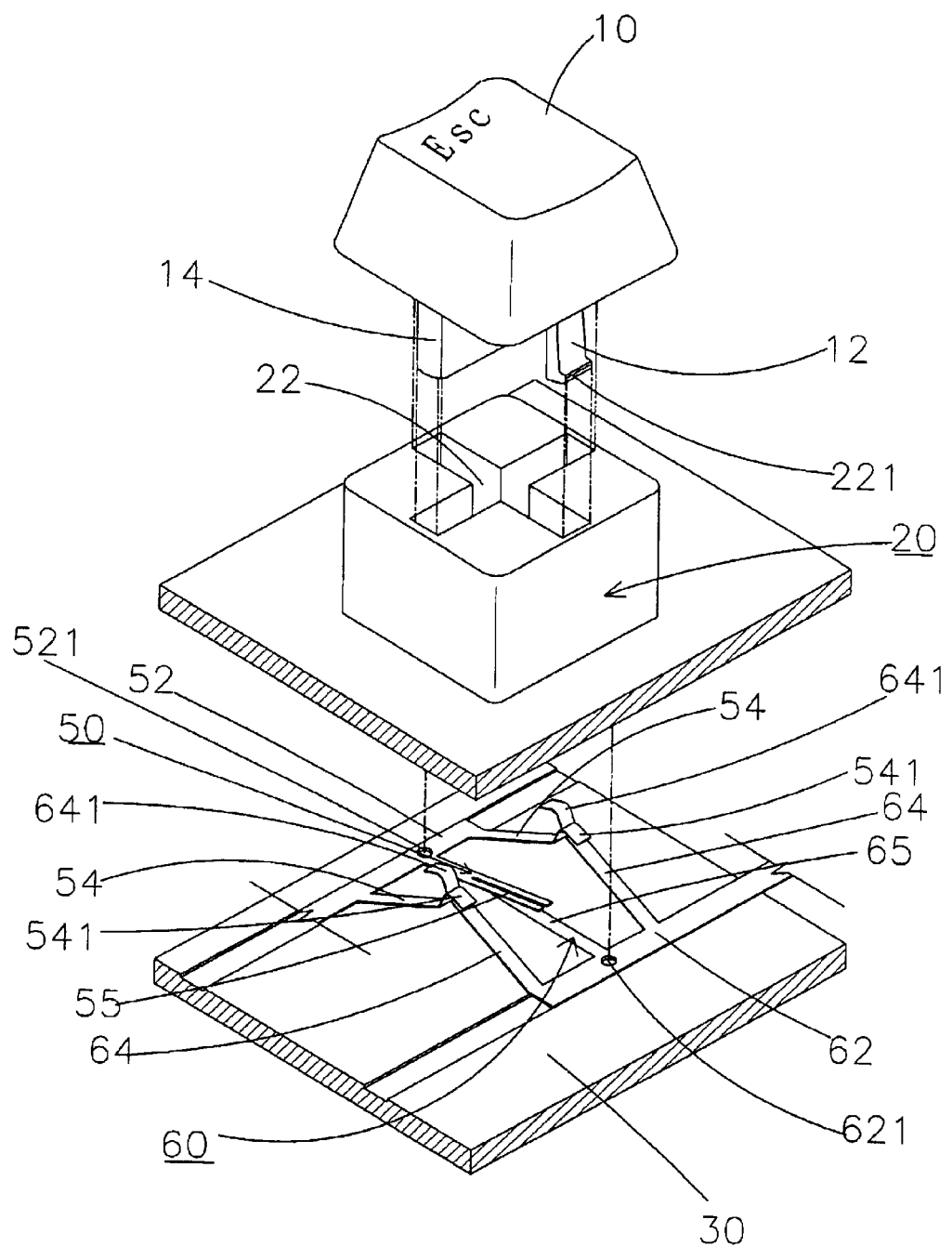
FIG. 4 is a perspective and exploded drawing of a key top, the upper case and a bottom case of the present invention.

2. Referring to FIG. 4, all adjacent elastic arms (54, 64) of the present invention are staggered in parallel; therefore, either being pressed to deform or in static state, they don't contact each other; the transverse bar (14) bridges over a recess portion (56) formed by staggered arched portions (541, 641) at the upper aspect of the four elastic arms (54, 64), as shown in FIG. 2A; therefore, when the transverse bar (14) is depressed downwardly, four elastic arms (54, 64) deform downwardly; since the upper electric conducting piece (55) connects with the connecting bands (52, 62), the depressed transverse bar (14) makes the upper electric conducting piece (55) displace downwardly to make the connecting point (551) contact the lower electric conducting piece (65); as indicated in FIG. 2B, the preferred embodiment of the upper electric conducting piece (55) of the present invention is cut into two halves and has two connecting points (551); referring to FIGS. 2A, 3A and 3B, the upper electric conducting piece (55) therefore easily displaces elastically and downwardly to increase the chance for any connecting point (551) to contact the lower electric conducting piece (65); when the exerted force on the key top (10) is released, the elastic arms (54, 64) and the upper electric conducting piece (55) recoil and displace upwardly to further press the transverse bar (14) to make the key top (10) ascend to an upper dead point in the insert hole (22); therefore, the upper electric conducting piece (55) and the lower electric conducting piece (65) separate and disconnect from each other.

3. The design of the upper and the lower electrode members (50, 60) of the present invention replace the elastic silicone rubber sheet, the upper and the lower electric conducting membrane sheets and the intermediate interfacing and isolating membrane sheet of the prior art; therefore, the present invention not only has simplified parts as well as the reduced manufacturing and assembling cost, but also eliminates the recycling process and the pollution caused by the discarded silver rubber circuits and the elastic rubber sheet on the electric conducting membrane sheet of the prior art.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A key structure comprising a set of key tops with contact footings of retaining hooks, an upper case with a plurality of insert holes wherein contact footings of retaining hooks are moveably inserted in insert holes and a bottom case to be assembled with the upper case; the present invention is characterized in that elastic upper and lower electrode members made of metal and capable of conducting electricity are inserted between every key top and the bottom case; the key top synchronously presses the upper and the lower electrode members to deform and displace so as to make the upper and the lower electrode members contact each other, conduct electricity and transmit signals; when the force exerted onto the key top is released, the upper and the lower electrode members recoil to disconnect each other and discontinue electric conduction; and said structure including a first connecting band having an inner lateral side rim and a second connecting band having an inner lateral side rim, and wherein the upper electrode member is slanted upwardly via the inner lateral side rim of the first connecting band, at least one elastic arm slanted at an upward angle and an upper electric conducting piece disposed at a smaller angle of elevation; at least a second elastic arm at an angle of elevation and a lower electric conducting piece disposed flatly in the lower case; wherein the elastic arms are staggered without contacting each other; when being depressed, the upper electric conducting piece displaces downwardly to contact the lower electric conducting piece for conducting electricity and transmitting signals through the two connecting bands disposed with through holes; the bottom plane of the upper case is disposed with a convex pin to insert and position in the through holes for connecting the connecting bands to position on the surface of the bottom portion of the upper case.

2. A key structure according to claim 1, the upper electric conducting piece in the upper electrode member has at least one moveable connecting point protruding downwardly; and in which the elastic arms of the upper and the lower electrode members include arched portions.

3. A key structure according to claim 1, wherein the upper electric conducting piece is cut into two halves thereby to have two connecting points for enhancing the contacting stability when the upper electric conducting piece presses downwardly to contact the lower electric conducting piece.

4. A key structure according to claim 1, wherein the connecting bands include a though hole and in which a convex pin is inserted and positioned by the through holes of the connecting bands of the upper and the lower electrode members to be disposed on the bottom case.

* * * * *